United States Patent Office 3,505,248
Patented Apr. 7, 1970

3,505,248
PROCESS FOR PRODUCING EXPANDABLE
STYRENE POLYMER PARTICLES
James L. Banks, Bay City, and Charles R. Despain, Midland, Mich., assignors to The Dow Chemical Company, Midland, Mich., a corporation of Delaware
No Drawing. Filed Nov. 16, 1964, Ser. No. 411,566
Int. Cl. C08f 47/00
U.S. Cl. 260—2.5                                     4 Claims

ABSTRACT OF THE DISCLOSURE

Partially collapsed cellular styrene polymer particles are provided with expand to a density of about one pound per cubic foot when unrestrained at room temperature in air.

This invention relates to an improved expandable thermoplastic resinous material. It more particularly relates to a partially collapsed cellular styrene polymer body which is expandable at ambient temperatures.

Pursuant to known procedures, a variety of thermoplastic polymeric and resinous materials may be expanded from a granular or bead form to assume a porous, cellular, solidified foam-like structure by the action of various propellants or agents for expanding or blowing the materials. The blowing agents, in accordance with common practice, are usually gases (or gas generating substances) or highly fugacious liquids which have been dissolved or otherwise intimately incorporated within the thermoplastic resinous material while it is in an unexpanded granular form. The application of heat to an unfoamed granular thermoplastic resinous material containing a blowing agent causes the blowing agent to be released or thermally expanded, or both, while the thermoplastic or moldable particulate material is attaining a foaming temperature at which it is sufficiently softened and yieldable to permit the pressure of the thermally expanding blowing agent to expand it into the desired foam structure.

The heat energy which is required to soften the resinous material and release the blowing agent for the foam forming function is conventionally derived from an externally generated source. Thus, steam, hot air and other heat supplying means are ordinarily employed for the purpose of foaming the thermoplastic material.

Although most of the expandable particulate thermoplastic resinous material is utilized in molding applications wherein a unitary body is produced from a particulate mass there are many applications, particularly those in the insulation field, wherein a unitary body is not required. For example, in a household refrigerator door which is formed from thermoplastic resinous sheet there is a cavity which is filled with an insulating material. A loose fill or pour type insulation such as expanded mica, foam particles, and the like is generally undesirable because under extended use movement of the particles causes attrition and compaction, and therefore reduced insulating value is achieved. Desirably, an insulating material should entirely fill the cavity in which it it disposed and be incapable of movement under normal use stresses.

It is an object of this invention to provide an improved partially expanded thermoplastic resinous article.

A further object of the invention is to provide a styrene polymer body having a cellular structure which expands at temperatures between about 5° and 35° centigrade.

Still another object of the invention is to provide an improved method for the preparation of such expandable cellular bodies.

These benefits and other advantages in accordance with the present invention are achieved in a mass consisting of expandable cellular styrene polymer particles composed of partially collapsed individually closed cells containing a volatile fluid foaming agent which is selected from the group consisting of:

(a) Neopentane/isopentane _____ 100/0 to 0/100
(b) Neopentane/neohexane _____ 100/0 to 10/90
(c) Neopentane/2,3 dimethylbutane __ 100/0 to 40/60
(d) Neopentane/n-Pentane _____ 100/0 to 20/80
(e) Isopentane/n-Pentane _____ 100/0 to 40/60
(f) Isopentane/neohexane _____ 100/0 to 30/70
(g) Isopentane/2,3 dimethylbutane ___ 100/0 to 50/50
(h) Isopentane/trichlorofluoromethane _____ 100/0 to 40/60
(i) Neopentane/trichlorofluoromethane 100/0 to 50/50

The polymer to be employed in the invention can have a viscosity characteristic corresponding to a viscosity of from about 4–15 centipoise determined for a 10 percent by weight solution of the polymer in toluene at 25° centigrade. The volatile fluid foaming agent is present in a concentration of from about 4–12 weight percent based on the polymer, beneficially from about 6–10 centipoise maintained in an atmosphere of a volatile fluid that has a permeability rate through the cell walls of the polymer that is not appreciably greater than the permeability rate of the fluid foaming agent within the collapsed cells.

The term "styrene polymer" includes polystyrene, and copolymers of styrene containing up to 20 percent by weight of another mono-olefinic polymerizable monomer and having a solution viscosity of from about 4–15 centipoise. This solution viscosity is determined by dissolving 10 percent by weight of the polymer (without blowing agent or other additive) in toluene and measuring the viscosity at a temperature of 25° centigrade.

Particularly low density re-expandable foams are obtained when the solution viscosity of the polystyrene is from about 4–15 centipoise (the viscosity of a 10 percent by weight solution of the polystyrene in toluene at 25° centigrade) when the following blowing agents are incorporated at concentrations of from about 4–12 weight precent based on the weight of the polystyrene:

(a) Neopentane/isopentane _____ 100/0 to 0/100
(b) Neopentane/neohexane _____ 100/0 to 10/90
(c) Neopentane/2,3 dimethylbutane __ 100/0 to 40/60
(d) Neopentane/n-Pentane _____ 100/0 to 20/80
(e) Isopentane/n-Pentane _____ 100/0 to 40/60
(f) Isopentane/neohexane _____ 100/0 to 30/70
(g) Isopentane/2,3 dimethylbutane ___ 100/0 to 50/50
(h) Isopentane/trichlorofluoromethane _____ 100/0 to 40/60
(i) Neopentane/trichlorofluoromethane 100/0 to 50/50

The partially collapsed particles employed in the present invention are readily prepared by a variety of methods. One particularly advantageous and beneficial method is to heat the particle to a temperature sufficiently high to cause softening thereof but not sufficiently high to permit the major portion of the blowing agent to escape from the particle, foaming the particle to a density of about 1 pound per cubic foot, and beneficially to a bulk density of from about 0.15 to 0.75 pound per cubic foot, thereafter, cooling the particle to cause contraction of the blowing agent and partial collapse of the cell walls. Oftentimes this is accomplished by simple heating of the particle in air and cooling the particle sufficiently rapidly that a significant portion of the blowing agent does not diffuse therefrom. For optimum low density particles, the foaming is performed under less than atmospheric pressure. In this manner, particle densities significantly less than one-half pound per cubic foot are readily obtained. The resultant collapsed particle is then readily reexpanded by exposure to a permeable atmosphere such as air. The particles are readily prepared by foaming to a low density, collapsing the particles or body to a higher density by exposure to atmospheric pressure at temperatures from about 5–35° centigrade, packaging of the particles in a container which provides an atmosphere which does not diffuse into the particle at a rate significantly different than the diffusion rate of blowing or expanding agent out of the polymer. Beneficially this is most readily accomplished by foaming the material to the desired low density, collapsing it, and immediately sealing in a substantially air tight container. For example, if the collapsed particles are in the form of beads or other similar small configurations, they are readily packaged in a substantially air tight container having a volume approaching the collapsed volume of the beads. Such a container can be a bag fabricated from a material having a low nitrogen-oxygen permeability rate such as are obtained when vinylidene chloride copolymers are used. Such a container of particles is remarkably stable. When the bag is filled and sealed the particles appear as loose granules. On storage or standing the air within the bag diffuses into the polymer particles and the bag is tightly filled. As air diffuses through the low permeability package and into the beads an equilibrium is reached and the particles do not expand further but are restrained by the bag. Such a container may be retained for long periods of time and then opened when the particles are to be used. Such collapsed particles have a relatively high density when compared to the density of the expanded particle, and significant savings in shipping costs as well as saving in warehouse space results. The particles or shaped article may be removed from such a bag and exposed to air or other gases which permeate the cell walls at a rate faster than the blowing agent, and they expand to generally the original foamed up volume.

The particles in accordance with the present invention solve a difficult problem in the field of insulation and filling of cavities and are found useful in other areas such as packaging. Generally the maximum pressure exerted by the particles while expanding is in the order of 1 pound per square inch. Thus, relatively delicate and fragile structures may be placed in a container with the expandable particles and the particles slowly expand and support the article in a relatively uniform manner and maintain it in spaced relationship from the sides of the container. Articles which beneficially are packaged employing this technique include electrical instruments such as meters, tubes, or valves, electronic assemblies, and the like. Glass articles both of the decorative and utilitarian variety as well as mechanical movements which are subject to damage, benefit from such packaging. As the particles expand without adhering together or to the article being packaged, upon opening one of the containers, the expanded foam particles are readily removed and the packaged article extracted therefrom. Generally with most surfaces which are not adhesive and do not chemically attack the thermoplastic resinous particles, no tendency for adhesion is observed and the article can be removed and is substantially contaminate-free thus eliminating the need for an overwrap which is often employed with conventional packing material and even with molded plastic foam packages.

EXAMPLE 1

A plurality of polystyrene granules were suspended in water and heated to a temperature of about 100° centigrade in a pressure vessel. 12 weight percent based on the total weight of the polystyrene of a mixture of 60 weight percent isopentane and 40 weight percent neopentane was added and the resultant mixture agitated for a period of 19 hours. The mixture was cooled and the polystyrene beads separated from the liquid phase. The polystyrene had a solution viscosity of 6 centipoise (viscosity of a 10 weight percent solution of polystyrene in toluene at 25° centigrade). Analysis of the treated polystyrene beads indicated that they contained 8.23 weight percent of the pentanes. A portion of the foregoing particles was placed in a densiometer and heated to 99° centigrade for 4 minutes. An expansion of 129 volumes occurred. On cooling to about 22° centigrade the foam collapsed within 1 minute and had a foam volume of 38 ($V_F/V_S$). The foam was exposed to air at ambient room temperature of between about 21 and 24° centigrade for a period of about 64 hours and had a foam volume of 108.

EXAMPLE 2

In a manner similar to Example 1, granules of polystyrene having a solution viscosity of 6 centipoise were treated with a mixture of 50 weight percent n-pentane and 50 weight percent neopentane to provide an expandable particle containing 6.96 percent by weight of the pentane mixture. The resultant expandable particles were expanded by heating for 5 minutes under a pressure of 8 pounds per square inch gauge of steam. The particles were removed from the steam treatment chamber and cooled to about 23° centigrade. They collapsed and had a wrinkled exterior surface. After standing for 24 hours in air the volume of the foam reached 78 volumes and in 48 hours, 100 volumes.

EXAMPLE 3

In a manner similar to Example 1, a plurality of samples were prepared utilizing various blowing agents and blowing agent mixtures. A polystyrene resin having a solution viscosity of 6 centipoise was employed. The samples were foamed in a densiometer at about 99° centigrade. The maximum volume was measured, and volume of the samples at 44 hours and 48 hours standing at room temperature and ambient atmospheric pressure were also measured. The results are set forth in the following table.

TABLE 7

| Sample No. | Blowing agent | Maximum volumes | Collapsed volumes | Volumes after 44 hrs. | Volumes after 48 hrs. |
| --- | --- | --- | --- | --- | --- |
| 1B | Isopentane | 75 | 33 | 44 | 60 |
| 2B | 40% isopentane, 60% n-pentane | 108 | 25 | 36 | 42 |
| 3B | n-Pentane | 51 | 25 | 26 | 33 |
| 4B | Neohexane | 80 | 24 | 24 | 26 |
| 5B | 2,3 dimethylbutane | 130 | 22 | 24 | 24 |
| 6B | 60% isopentane, 40% neopentane. | 107 | 35 | 63 | 95 |
| 7B | Trichlorofluoromethane | 42 | 25 | 32 | 33 |

EXAMPLE 4

Several samples of soluble polystyrene granules were prepared by postpressurizing an aqueous suspension of the polystyrene granules in the presence of a suspending agent and the desired blowing agent. 80 parts by weight of the polystrene granules were added to 160 parts of water containing 0.24 part of a water soluble methyl cellulose having a solution viscosity of 4000 centipoise (viscosity of 2 percent by weight solution in water at 25° centigrade) and 3.8 parts by weight of neopentane and 5.8 parts by weight of isopentane. The methyl cellulose was dissolved in the water, polystyrene granules added with agitation, the pentanes were then added and the vessel heated to 100° centigrade and maintained at this temperature for a period of 19 hours. After 19 hours the reaction vessels were cooled, the polystyrene granules separated from the aqueous phase, washed with water, and air dried. Polystyrenes of varying molecular weight were employed and the resultant samples were foamed in a densiometer. The polystyrene granules were analyzed for volatile content which is believed to be substantially commensurate with the amount of pentane absorbed. The results are set forth in the following table.

TABLE 8

| Sample No. | Polymer visc., cps. | Percent volatile | Foaming temp., °C. | Minimum density, lbs./ft.$^3$ | Collapsed density, lbs./ft.$^3$ | Final density lbs./ft. |
|---|---|---|---|---|---|---|
| 1 | 3.0 | 5.28 | 99 | 0.600 | 2.85 | 1.39 |
| 2 | 4.2 | 8.83 | 99 | 0.520 | 1.42 | 0.610 |
| 3 | 8.75 | 8.7 | 99 | 0.650 | 1.25 | 0.755 |
| 4 | 13.7 | 6.84 | 99 | 0.860 | 1.35 | 0.920 |
| 5 | 17.6 | 8.52 | 99 | 0.980 | 1.14 | 1.14 |

NOTE.—The minimum density refers to the maximum volume expansion during the foaming process. The collapsed density is the density of the foam when cooled from the foaming temperature to 23° centigrade. The final density is the density of the foam after standing in air at 25° centigrade under atmospheric pressure for a period of 48 hours.

EXAMPLE 5

The procedure of Example 4 was repeated utilizing a polystyrene having a solution viscosity of 8.75 centipoise and various blowing agents. The results are set forth in Table 9 wherein the meaning of the terms is identical with those of Example 4.

TABLE 9

| Sample No. | Blowing agent | Percent volatile | Foaming temp., °C. | Minimum density, lbs./ft.$^3$ | Collapsed density, lbs./ft.$^3$ | Final density, lbs./ft.$^3$ |
|---|---|---|---|---|---|---|
| 1 | n-Pentane | 6.71 | 99 | 0.735 | 2.08 | 1.46 |
| 2 | Neopentane | 5.80 | 103 | 0.614 | 1.12 | 0.82 |
| 3 | Isopentane | 5.35 | 99 | 0.602 | 1.42 | 0.72 |
| 4 | Neohexane | 5.25 | 100 | 0.782 | 2.60 | 2.42 |
| 5 | Trichlorofluoromethane | 9.83 | 103 | 0.557 | 2.32 | 1.33 |
| 6 | 2,3 dimethylbutane | 6.19 | 100 | 0.482 | 2.60 | 2.60 |
| 7 | 30% neopentane, 70% n-pentane | 8.43 | 99 | 0.606 | 1.51 | 0.687 |
| 8 | 10% neopentane, 90% n-pentane | 5.76 | 100 | 0.806 | 2.08 | 1.42 |
| 9 | 67% isopentane, 33% n-pentane | 9.83 | 98 | 0.625 | 1.16 | 0.790 |
| 10 | 40% isopentane, 60% n-pentane | 5.80 | 99 | 0.550 | 2.02 | 1.13 |
| 11 | 60% neopentane, 40% 2,3 dimethylbutane | 8.75 | 99 | 0.538 | 1.00 | 0.625 |
| 12 | 30% neopentane, 70% 2,3 dimethylbutane | 9.62 | 100 | 0.688 | 1.22 | 1.10 |
| 13 | 30% neopentane, 70% neohexane | 9.43 | 100 | 0.584 | 1.12 | 0.754 |
| 14 | 50% isopentane, 50% trichlorofluoromethane | 8.42 | 98 | 0.658 | 1.49 | 0.790 |
| 15 | Isopentane | 3.24 | 99 | 1.56 | 1.69 | 1.69 |
| 16 | Neopentane | 5.8 | 103 | 0.614 | 1.12 | 0.820 |
| 17 | Isopentane | 8.35 | 99 | 0.602 | 1.42 | 0.720 |
| 18 | 33% n-pentane, 67% isopentane | 9.83 | 98 | 0.625 | 1.16 | 0.790 |
| 19 | 50% n-pentane, 50% neopentane | 10.11 | 99 | 0.558 | 1.69 | 0.665 |

EXAMPLE 6

Collapsed particles substantially as prepared in Example 1 were placed within a shaped polystyrene composition hollow door panel for a refrigerator. Sufficient collapsed particles were placed in the cavity that on theoretical expansion would represent 105 percent of the volume of the cavity in the door. After 36 hours at 25° centigrade and atmospheric pressure the particles were observed to have expanded and completely fill the void without distorting the door.

EXAMPLE 7

A corrugated board carton measuring approximately 6 x 6 x 6 inches is filled to a depth of about one inch with collapsed particles as are obtained from the procedure utilized for Sample 3 of Example 5. A 60 watt light bulb was placed over the particles and a sufficient quantity of particles were placed in the carton to extend about 2 inches from the bottom and a number of particles were placed on the light bulb. The carton was closed and sealed with tape. After 24 hours, checking the carton indicated that the particles had expanded to retain the light bulb and prevent any movement thereof. On opening the carton the light bulb was found to be positioned generally centrally within the carton and the remainder of the space was filled with expanded particles which had conformed to each other and substantially eliminated interstitial spaces. No tendency was observed for the foam particles to adhere to the glass envelope of the light bulb or to the metal base.

As is apparent from the foregoing specification, the method and article of the present invention are susceptible of being embodied with various alterations and modifications which may differ particularly from those that have been desecribed in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method of preparing a mass of styrene polymer particle which, when mechanically unrestrained and in the presence of air at ambient temperature, expands, the steps of the method comprising providing a plurality of styrene polymer particles having a solution viscosity of from about 4 to 15 centipoise as determined for a 10 percent by weight solution of the polymer in toluene, the particles containing a fluid foaming agent having a concentration of from about 4 to 12 weight percent based on the polymer, the volatile fluid foaming agent selected from the group consisting of:

(a) Neopentane/isopentane ......... 100/0 to 0/100
(b) Neopentane/neohexane ......... 100/0 to 10/90
(c) Neopentane/2,3-dimethylbutane .. 100/0 to 40/60
(d) Neopentane/n-pentane ......... 100/0 to 20/80
(e) Isopentane/n-pentane ......... 100/0 to 40/60
(f) Isopentane/neohexane ......... 100/0 to 30/70
(g) Isopentane/2,3-dimethylbutane ... 100/0 to 50/50
(h) Isopentane/trichlorofluoromethane ..................... 100/0 to 40/60
(i) Neopentane/trichlorofluoromethane ..................... 100/0 to 50/50 heating the particles to a temperature sufficiently high to cause softening thereof but not sufficiently high to permit a major portion of the blowing agent to escape from the particles, foaming the particles to a density of up to about one pound per cubic foot under less than atmospheric pressure, cooling the particles under a pressure of less than atmospheric pressure, thereby causing contraction of the blowing agent, collapsing the particles by exposing to atmospheric gas pressure of from about 5° C. to 35° C., thereby providing a partially collapsed cellular particle stable at ambient temperatures in the absence of air, the particles being expandable to a generally uncollapsed form by exposure to air at ambient temperatures.

2. The method of claim 1 including the step of packaging the particles in a container which provides an atmosphere which does not diffuse into the particles at a rate significantly different than the diffusion rate of the blowing agent out of the polymer.

3. The method of claim 2 wherein the container is a bag and the particles are mechanically restrained from expansion by the bag.

4. The method of claim 1 wherein the particles are foamed to a bulk density of from about 0.15 to about 0.75 pound per cubic foot.

References Cited

UNITED STATES PATENTS 3,344,221  9/1967  Moody et al. ......... 260—2.5
3,259,594  7/1966  Wright.

MURRAY TILLMAN, Primary Examiner

W. T. BRIGGS, Sr., Assistant Examiner

U.S. Cl. X.R.

260—33.6, 33.8, 93.5